Patented Oct. 26, 1948

2,452,029

UNITED STATES PATENT OFFICE 2,452,029

ADDITION PRODUCTS FROM ACRYLIC ESTERS

Herman A. Bruson, Rydal, and Warren D. Niederhauser, Philadelphia, Pa., assignors, by mesne assignments, to Rohm & Haas Company, Philadelphia, Pa., a corporation of Delaware No Drawing. Application June 21, 1945, Serial No. 600,851

20 Claims. (Cl. 260—405)

This invention relates to addition products of acrylic acid esters and drying oil acids or their esters.

The copolymerization of acrylic esters with drying oils has been described. The products obtained by the hitherto proposed methods are resinous in nature and of large molecular size.

In contrast to such resinous materials, the addition products of this invention are not polymers or resins. Most of the products are distillable under low pressure and are compounds which are structurally addition products of one mol of acrylic ester per mol of unsaturated fatty acid. They are primarily oils.

They are useful as plasticizers and as intermediates for the preparation of dicarboxylic acids and resins therefrom. They are useful as intermediates for the preparation of amides, including linear polyamides.

According to this invention, new products are obtained by reacting by addition at about 80° C. to about 300° C. esters of acrylic acid and long-chained fatty acids, or esters thereof, in which there are present two olefinic linkages in conjugate relationship. This addition is effected in the absence of any polymerizing catalyst and advantageously in the presence of an inhibitor for polymerization and/or under an inert atmosphere, such as nitrogen or carbon dioxide.

Typical unsaturated, long-chained, aliphatic or fatty acids having at least two olefinic linkages, of which a pair is in conjugate relationship, are α-elaeostearic acid, β-elaeostearic acid, α-licanic acid, β-licanic acid, and 9,11-octadecadienic acid. Technical mixtures of such acids resulting from hydrolysis of tung oil or oiticica oil may be used. Likewise, there may be used dehydration products of castor oil or castor oil fatty acids or the acids containing conjugated double bonds formed by alkaline rearrangement of various unsaturated fatty acids and esters.

In place of the free fatty acids just described, there may be reacted the esters of these acids and alcohols, both monohydric and polyhydric. An important class of such esters is based upon monohydric alcohols such as methyl, ethyl, isopropyl, butyl, isobutyl, amyl, hexyl, octyl, decyl, dodecyl, cetyl, stearyl, cyclohexyl, benzyl, chloroethyl, dimethylaminoethyl, phenoxyethyl, tert.-butylphenoxyethyl, tetrahydrofurfuryl, and the like. The fatty acid esters of moderate molecular weight yield addition products with acrylic esters from lower alcohols which are distillable in high vacuum without decomposition. There may also be used the class of phenyl esters. Yet another class of esters is obtained from the unsaturated fatty acids and polyhydric alcohols, such as the alkylene glycols, glycerine, pentaerythritol, sorbitol, mannitol, and the like. When fatty acid esters of the polyhydric alcohols are reacted with an acrylic acid ester, it is particularly desirable that the reaction be effected in the presence of a small amount of an inhibitor such as hydroquinone, pyrogallol, naphthylamine, α-naphthol, diphenylamine, or the like.

Any of the esters of acrylic acid and monohydric alcohols may be used. Typical alcohol groups are methyl, ethyl, isopropyl, butyl, isobutyl, amyl, hexyl, octyl, decyl, dodecyl, cetyl, cyclohexyl, benzyl, chloroethyl, tetrahydrofurfuryl, phenyl, methylphenyl, etc.

Details of the preparation of typical addition products are presented in the following illustrative examples.

Example 1

A mixture of 167 parts of tung oil fatty acids and 77.5 parts of methyl acrylate was heated under reflux for forty-eight hours at 95°–124° C. The reaction mixture was distilled under reduced pressure to give 141 parts, a 65% yield of addition product, having a boiling range of 240°–250° C./3 mm. This product was a pale-yellow oil having a density, $d_{20}^{20}$, of 0.9971 and a refractive index, $n_D^{20}$, of 1.4867. The analytical data (saponification number, 301; iodine number, 140; and acid number, 150, as compared to the calculated values for $C_{22}H_{36}O_4$ of: Saponification number, 308; iodine number, 140; and acid number of 154) show that the distilled product is essentially the adduct of one mol of fatty acid and one mol of methyl acrylate.

Example 2

A mixture of 41.7 parts of β-elaeostearic acid, 17.2 parts of methyl acrylate, and 0.2 part of hydroquinone was heated at 100°–155° C. under reflux for nineteen hours. Upon distillation there was obtained 35.5 parts (a yield of 65%) of addition product having a boiling range of 240°–244° C./3 mm. The following data were determined for this product: Saponification number, 306; acid number, 150; iodine number, 132; density, $d_4^{20}$, 0.9967; and refractive index, $n_D^{20}$, 1.4844.

Example 3

A mixture of 501 parts of tung oil fatty acids, 270 parts of ethyl acrylate, and 0.2 part of hydroquinone was heated at 115°–125° C. under reflux for forty hours. The product was distilled to give 355 parts of pale-yellow oil having a boiling range of 237°–247° C./2 mm. The following data were determined for the product: Acid number, 130; saponification number, 292; iodine number, 132; refractive index, $n_D^{20}$, 1.4833; density, $d_4^{20}$, 0.9647. Calculated values for $C_{22}H_{38}O_4$ follow: Acid number, 148; saponification number, 296; and iodine number, 134.

Example 4

A mixture of 36 parts of β-licanic acid, 13 parts of methyl acrylate, and 0.2 part of hydroquinone was heated at 90°–150° C. for twenty-seven hours under reflux. On distillation, there was obtained 29 parts (63% yield) of addition product having a boiling range of 265°–275° C./4 mm. The product was a thick, pale-yellow oil. The following values were determined: Saponification number, 298; density, $d_4^{20}$, 1.0427; and refractive index, $n_D^{20}$, 1.4948. The calculated saponification number for $C_{22}H_{34}O_5$ is 297.

Example 5

A mixture of 280 parts of octadecadienic acid obtained by the dehydration of ricinoleic acid, 130 parts of ethyl acrylate, and 0.5 part of hydroquinone was heated at 115°–145° C. under reflux for sixty-eight hours. The adduct was a pale-yellow oil having a boiling range of 235°–250° C./4 mm. The following data were found: Acid number, 135; saponification number, 264; density, $d_4^{20}$, 0.9505; and refractive index, $n_D^{20}$, 1.4816.

In place of the methyl and ethyl acrylates used above, other acrylic acid esters may be used with the same sort of addition product resulting.

Example 6

A mixture of 43.8 parts of methyl elaeostearate, 21.5 parts of methyl acrylate, and 0.2 part of hydroquinone was heated under reflux for forty-eight hours at 100° to 145° C. The reaction mixture was distilled to give 39.5 parts of light-yellow oil having a boiling range of 220°–230° C./3 mm., a refractive index, $n_D^{20}$, of 1.4775, and a density, $d_4^{20}$, of 0.9762. The analytical data (saponification number, 287, and iodine number, 126, as compared to the calculated values for $C_{23}H_{38}O_4$ of: saponification number, 297, and iodine number of 134) show that the product is primarily the adduct of one mol of methyl acrylate and one mol of methyl elaeostearate.

Example 7

A mixture of 32 parts of methyl licanate, 15 parts of methyl acrylate, and 0.1 part of hydroquinone was heated under reflux for forty hours at 90°–120° C. The product was distilled to give a thick yellow oil having a boiling range of 240°–255° C./1 mm. and a refractive index, $n_D^{23}$, of 1.4885. The saponification number, 271, showed that this was primarily the desired adduct.

Example 8

A mixture of 51.5 parts of methyl octadecadienate, obtained by the dehydration of methyl ricinoleate, 26 parts of methyl acrylate, and 0.5 part of di-β-naphthol was placed in an autoclave. The temperature of the reaction mixture was gradually raised to 300° C. over a period of one hour. The product was removed and distilled to give 33 parts (50% yield) of yellow oil having a boiling range of 235°–245° C./4 mm., a density, $d_4^{20}$, of 0.9802, and a refractive index, $n_D^{20}$, of 1.4736. The saponification number determined for this product was 300 in comparison with the theoretical one of 295 for $C_{23}H_{40}O_4$.

In place of the methyl esters of the various unsaturated fatty acids shown above, there may be used any other ester of these or other acids having a pair of conjugated double bonds. Such ester may be that of a polyhydric alcohol, as shown in the following example.

Example 9

A mixture of 291 parts of tung oil, 100 parts of ethyl acrylate, and 2 parts of hydroquinone was heated under reflux for twenty-one hours at 120°–150° C. to give 390 parts of a viscous yellow oil. Two hundred parts of the product was saponified by heating under reflux, with stirring, for two hours in 1,000 parts of 25% methanolic sodium hydroxide. The reaction mixture was acidified to Congo red with 6N hydrochloric acid and diluted with 2,000 parts of water. The yellow solid was filtered and recrystallized from nitromethane to give 137 parts (79% yield) of a mixture of isomeric dicarboxylic acids, having a melting point of 85°–95° C., and having the formula $C_{21}H_{34}O_4$. One of the isomers, which was separated by recrystallization from butanol, melted at 110° C. Oxidation of this acid with permanganate at 5° C. gave azelaic acid, which demonstrates that the structure of the dicarboxylic acid is

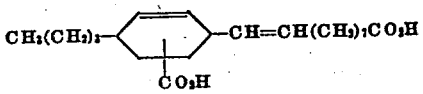

We claim:

1. Monomeric addition products of (a) one molecular equivalent of an ester of acrylic acid and a monohydric alcohol and (b) one molecular equivalent of a compound selected from the class consisting of drying oil fatty acids having conjugate olefinic bonds and esters thereof.

2. The monomeric addition product of (a) one molecule of an ester of acrylic acid and a monohydric alcohol and (b) one molecule of a drying oil fatty acid having conjugate olefinic bonds.

3. The monomeric addition product from (a) one molecular equivalent of an ester of acrylic acid and a monohydric alcohol and (b) one molecular equivalent of an ester of a drying oil fatty acid having conjugate olefinic bonds.

4. The monomeric addition product of (a) one molecular equivalent of an ester of acrylic acid and a monohydric alcohol and (b) one molecular equivalent of an ester of a drying oil fatty acid, having conjugate olefinic bonds, and a saturated lower aliphatic monohydric alcohol.

5. The monomeric addition product of (a) one molecular equivalent of an ester of acrylic acid and a saturated lower aliphatic monohydric alcohol and (b) one molecular equivalent of an ester of a drying oil fatty acid, having conjugate olefinic bonds, and a saturated lower aliphatic monohydric alocohol.

6. The monomeric addition product of (a) one molecular equivalent of an ester of acrylic acid and a saturated lower aliphatic monohydric alcohol and (b) one molecular equivalent of an ester of elaeostearic acid.

7. The monomeric addition product of (a) one molecular equivalent of an ester of acrylic acid and a saturated lower aliphatic monohydric alcohol and (b) one molecular equivalent of an ester of octadecadienic acid.

8. The monomeric addition product of (a) one molecular equivalent of an ester of acrylic acid and a saturated lower aliphatic monohydric alcohol and (b) one molecular equivalent of an ester of elaeostearic acid and a saturated lower aliphatic alcohol.

9. The monomeric addition product of (a) one molecule of an ester of acrylic acid and a saturated lower aliphatic monohydric alcohol and (b) one molecule of an ester of octadecadienic acid and a saturated lower aliphatic monohydric alcohol.

10. The monomeric addition product of one molecule of ethyl acrylate and one molecule of methyl elaeostearate.

11. The monomeric addition product of one molecule of ethyl acrylate and one molecule of methyl octadecadienate.

12. The monomeric addition product of (a) one molecule of an ester of acrylic acid and a saturated lower aliphatic monohydric alcohol and (b) one molecule of a drying oil fatty acid having conjugate double bonds.

13. The monomeric addition product of one molecule of ethyl acrylate and one molecule of octadecadienic acid.

14. A method of preparing new monomeric addition products which comprises reacting by addition in the absence of polymerization catalyst between about 80° C. and 300° C. (a) one molecular proportion of an ester of acrylic acid and a monohydric saturated aliphatic alcohol and (b) one molecular proportion of a compound selected from the class consisting of drying oil fatty acids, having conjugate olefinic bonds, and esters thereof.

15. A method of preparing new monomeric addition products which comprises reacting by addition in the presence of a polymerization inhibitor between 80° C. and 300° C. (a) one molecular proportion of an ester of acrylic acid and a monohydric saturated aliphatic alcohol and (b) one molecular proportion of a compound selected from the class consisting of drying oil fatty acids, having conjugate olefinic bonds, and esters thereof.

16. A method of preparing new monomeric addition products which comprises reacting by addition between 80° C. and 300° C. in the absence of polymerization catalyst and under an inert atmosphere (a) one molecular proportion of an ester of acrylic acid and a saturated lower aliphatic monohydric alcohol and (b) one molecular proportion of an ester of a drying oil fatty acid having conjugate olefinic bonds.

17. A method of preparing new monomeric addition products which comprises reacting by addition between 80° C. and 300° C. in the absence of a polymerization catalyst and under an inert atmosphere (a) one molecular proportion of an ester of acrylic acid and a saturated lower aliphatic monohydric alcohol and (b) one molecular proportion of an ester of a drying oil fatty acid, having conjugate double bonds, and a saturated lower aliphatic monohydric alcohol.

18. A method of preparing a new monomeric addition product which comprises reacting by addition between 80° C. and 300° C. in the absence of a polymerization catalyst and under an inert atmosphere (a) one molecular proportion of ethyl acrylate and (b) one molecular proportion of methyl elaeostearate.

19. A method of preparing a new monomeric addition product which comprises reacting by addition between 80° C. and 300° C. in the absence of polymerization catalyst and under an inert atmosphere (a) one molecular proportion of ethyl acrylate and (b) one molecular proportion of methyl octadecadienate.

20. A method of preparing a new monomeric addition product which comprises reacting by addition between 80° C. and 300° C. in the absence of polymerization catalyst and under an inert atmosphere (a) one molecular proportion of ethyl acrylate and (b) one molecular proportion of octadecadienic acid.

HERMAN A. BRUSON.
WARREN D. NIEDERHAUSER.

REFERENCES CITED

The following references are of record in the file of this patent:

UNITED STATES PATENTS

| Number | Name | Date |
| --- | --- | --- |
| 2,160,532 | Barrett et al. | May 30, 1939 |
| 2,312,731 | Salathiel | May 2, 1943 |

FOREIGN PATENTS

| Number | Country | Date |
| --- | --- | --- |
| 548,212 | Great Britain | Sept. 30, 1942 |